US012619495B2

(12) United States Patent
Kaynak et al.

(10) Patent No.: US 12,619,495 B2
(45) Date of Patent: May 5, 2026

(54) THRESHOLDS FOR SOFT READS OF DATA

(71) Applicant: MICRON TECHNOLOGY, INC., Boise, ID (US)

(72) Inventors: Mustafa N. Kaynak, San Diego, CA (US); Sivagnanam Parthasarathy, Carlsbad, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 33 days.

(21) Appl. No.: 18/783,951

(22) Filed: Jul. 25, 2024

(65) Prior Publication Data

US 2026/0030101 A1     Jan. 29, 2026

(51) Int. Cl.
*G06F 11/00* (2006.01)
*G06F 11/10* (2006.01)

(52) U.S. Cl.
CPC ...... *G06F 11/1068* (2013.01); *G06F 11/1016* (2013.01)

(58) Field of Classification Search
CPC ............. G06F 11/1068; G06F 11/1016; G06F 11/1024; G06F 11/1056
See application file for complete search history.

(56) References Cited

U.S. PATENT DOCUMENTS

| | | | |
|---|---|---|---|
| 8,850,283 B2 * | 9/2014 | Niewczas | ............. H04L 1/1845 |
| | | | 714/748 |
| 9,001,587 B2 | 4/2015 | Eun et al. | |
| 9,129,696 B2 | 9/2015 | Joo et al. | |
| 10,283,215 B2 | 5/2019 | Marelli et al. | |
| 10,474,525 B2 * | 11/2019 | Sharon | ................ G06F 11/1048 |
| 10,521,290 B2 | 12/2019 | Barbato | |
| 11,620,050 B2 * | 4/2023 | Sravan | ................. G06F 3/0679 |
| | | | 711/154 |

* cited by examiner

*Primary Examiner* — Esaw T Abraham
(74) *Attorney, Agent, or Firm* — Tarolli, Sundheim, Covell & Tummino LLP

(57) ABSTRACT

A method for selecting Soft Bit Read (SBR) thresholds in a memory device, includes setting, by a controller, a range of SBR thresholds around a Hard Read Position (HRP) for the memory device. The controller calculates mutual information for each set of SBR thresholds within the range of SBR thresholds. The controller calculates a theoretical compression ratio for each set of SBR thresholds in the range of SBR thresholds. The controller selects SBR thresholds from the range of SBR thresholds that provide a balance of the mutual information and the theoretical compression ratio.

14 Claims, 6 Drawing Sheets

300

STRESS MEMORY DEVICE TO TRIGGER RATE — 310

COLLECT THRESHOLD DISTRIBUTIONS — 315

DETERMINE HARD READ POSITION — 320

DETERMINE RANGE OF SBR THRESHOLDS AND MUTUAL INFORMATION RANGE — 325

COMPUTE RANGE OF COMPRESSION RATIOS — 330

RETRIEVE CORRECTION CAPABILITY — 335

SELECT SBR THRESHOLDS — 340

THRESHOLDS FOR SOFT READS OF DATA

TECHNICAL FIELD

This disclosure relates to selecting soft bit read (SBR) thresholds for soft reads of data from a memory device.

BACKGROUND

A memory sub-system includes a memory device designed for data storage. These memory devices are implemented as non-volatile and volatile memory devices in various examples. In some such examples, a host system employs a memory sub-system for the purposes of storing data on the memory devices and for retrieving data from the memory devices.

Not-AND (NAND) flash memory is a type of non-volatile storage technology used in electronic devices and computers for data storage. In NAND flash memory, data is stored in memory cells that can hold electrical charges, representing data bits. A threshold voltage ($V_t$) of a cell determines a state (0 or 1) of the memory cell, which is employed for reading and writing data accurately.

Error Correction Codes (ECC), such as Low-Density Parity-Check (LDPC) codes are used to correct errors that occur during the reading and writing processes of memory cells of memory devices. Conventional ECC employs hard bit reads, where each memory cell is read at a single threshold voltage to determine a state of each memory cell. However, hard reads have a limited ability to correct errors. To improve error correction capabilities, soft information (reliability information) can be used. Soft information is obtained by performing multiple reads at different threshold voltages (soft bit reads), which aids in assigning reliability values to the bits read. This additional information allows ECC to correct more errors, approaching the theoretical limits of correction capabilities (Shannon limit).

DETAILED DESCRIPTION

Figure 1A:
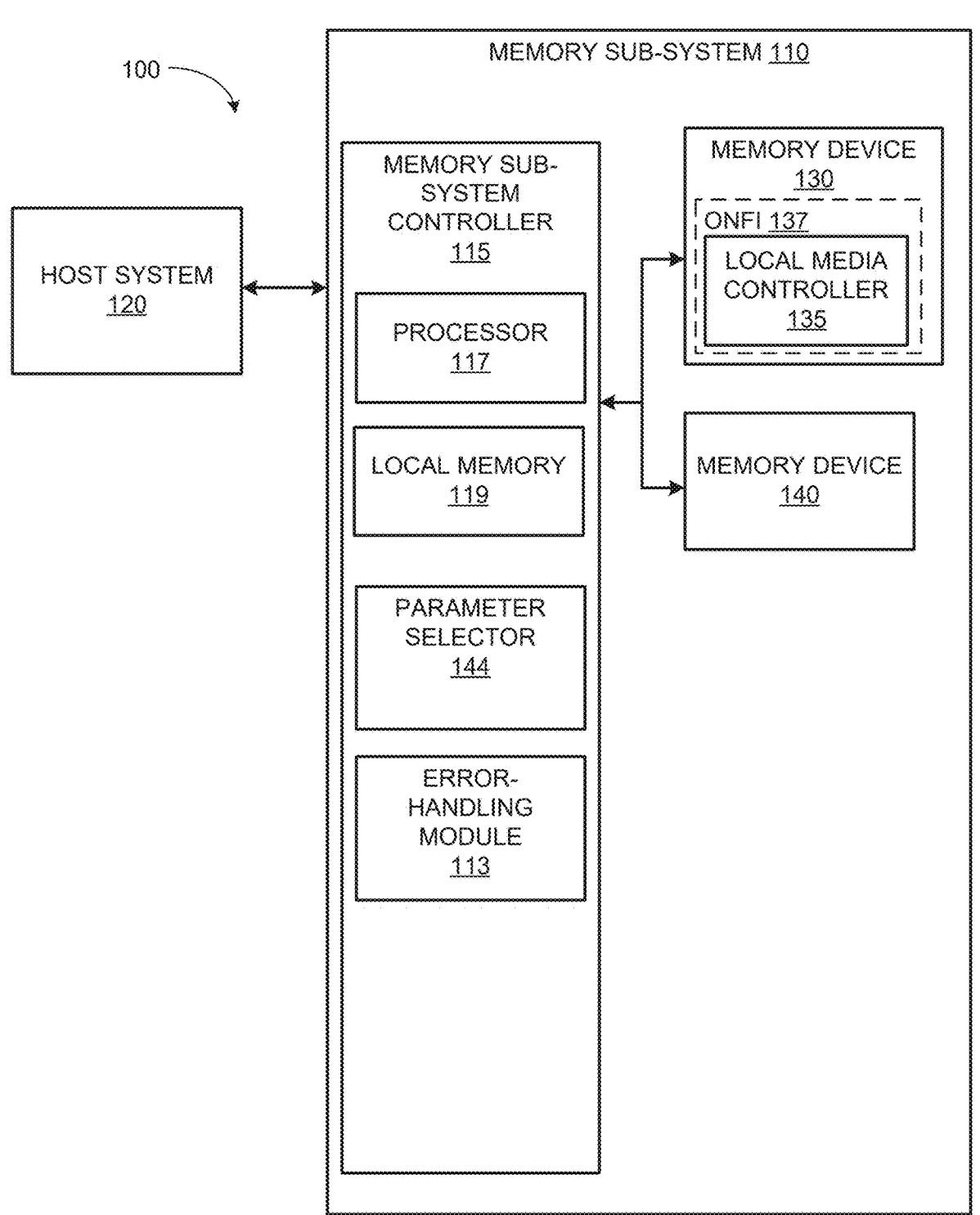
FIG. 1A illustrates a system for selecting soft bit read thresholds for decoding data from a memory sub-system.

This description is related to selecting Soft Bit Read (SBR) thresholds in a memory sub-system, such as a memory sub-system that implements Not-AND (NAND)

flash memory. Tuning the SBR improves error correction capabilities and operational efficiency of the memory sub-system.

A soft read of data includes executing multiple reads at different voltages to gather more detailed reliability information about the data stored in the memory sub-system, which information is referred to as soft information. This soft information enhances an ability of an error correction code (ECC) to correct errors, pushing the operation of the memory sub-system closer to the theoretical limits defined by the Shannon limit. The different voltages include a Hard Read Position (HRP) and, as an example, two Soft Bit Read (SBR) thresholds, which determine the relative position of soft read voltages with respect to the HRP or a threshold. SBR thresholds can be tuned to balance error correction capability and data transfer in situations where soft information is compressed.

Additionally, this description provides a cost function that weighs factors such as mutual information (MI), compression ratio of soft information and correction capabilities. MI measures how much the output from the memory sub-system (after reading) reflects the input data, with a higher MI indicating less uncertainty and better prediction of original data from the read data. The cost function, which is adjustable statically or dynamically, helps determine the SBR thresholds that balance these factors according to system needs. Furthermore, the systems and methods provided in this description enables dynamic adjustments of a target compression ratio and correction capability based on performance data (e.g., real-time performance data), ensuring high rates of speed and data reliability under varying conditions. The systems and methods of this description enhances error correction and increases system efficiency by reducing the data transfer volume through effective compression of soft information. The flexibility offered by adjustment of SBR thresholds and the leveraging of the cost function provide adaptability across different operational demands and conditions. Ultimately, the operations described in this description improve system performance by balancing correction capabilities with compression ratios.

More generally, this description relates to systems and methods for selecting SBR thresholds for a memory device in a memory sub-system designed to enhance the quality of service (QoS) and reduce decode latency in NAND flash memory. Some examples of a memory sub-system include high density non-volatile memory devices where retention of data is desired during intervals of time where no power is supplied to the memory device. One example of non-volatile memory devices is a NAND memory device. A non-volatile memory device is a package that includes a die(s). Each such die can include a plane(s). For some types of non-volatile memory devices (e.g., NAND memory devices), each plane includes a set of physical blocks, and each physical block includes a set of pages. Each page includes a set of memory cells, which are commonly referred to as cells. A cell is an electronic circuit that stores information. A cell stores at least one bit of binary information and has various logic states that correlate to the number of bits being stored. The logic states are represented by binary values, such as '0' and '1', or as combinations of such values, such as '00', '01', '10' and '11'.

A block refers to a unit of the memory device used to store data. In various examples, the unit could be implemented as a group of memory cells, a wordline group, a wordline or as individual memory cells. Multiple blocks are grouped together to form separate partitions (e.g., planes) of the memory device to enable concurrent operations to take place on each plane. A solid-state drive (SSD) is an example of a memory sub-system that includes a non-volatile memory device(s) and a memory sub-system controller to manage the non-volatile memory devices.

The memory sub-system controller is configured/programmed to encode the host and other data, as part of a write operation, into a format for storage at the memory device(s). Encoding refers to a process of generating parity bits from embedded data (e.g., a sequence of binary bits) using an error correction code (ECC) and combining the parity bits to the embedded data to generate a Low Density Parity-Check (LDPC) codeword. LDPC encoding refers to an encoding method that utilizes an LDPC code to generate the parity bits, which can be referred to as a parity codeword. User data (e.g., embedded data) is combined with the parity codeword to form the LDPC codeword, which may alternatively be referred to simply as a codeword.

The LDPC code is defined by, among other things, a sparse parity-check matrix, alternatively referred to as an H matrix, denoted as H. Each row of the H matrix embodies a linear constraint imposed on a designated subset of data bits. Entries within the H matrix, either '0' or '1', signify the participation of individual data bits in each constraint. Stated differently, each row of the H matrix represents a parity-check equation, and each column corresponds to a bit in the codeword. During encoding, using the user data (embedded data) along with either the H matrix or the generator matrix which is inverse of H matrix parity bits are generated. The generated parity codeword is appended to the user data to generate the codeword (LDPC codeword). Thus, the codeword includes the user data and the parity codeword, allowing for identification and rectification of errors. The codeword is storable at the memory device(s) of the memory sub-system.

Additionally, the memory sub-system controller can decode codewords, as part of a read operation, stored at the memory device(s) of the memory sub-system. Decoding refers to a process of reconstructing the original user data (e.g., sequence of binary bits embedded in the codeword) from the codeword received from storage at the memory device(s). LDPC decoding refers to a decoding method that utilizes the LDPC code to reconstruct the original user data (embedded data).

In general, LDPC codes come in two main types based on the column weight (CW), which is the number of parity bits with which each codeword bit interacts. Regular LDPC codes have a fixed CW for all codeword bits, while irregular LDPC codes allow for varying CWs. Initially, during LDPC decoding, the codeword (an LDPC codeword) is compared with the expected relationships encoded in the H matrix. In particular, the codeword is multiplied by a transpose of the H matrix associated with the LDPC code used to encode the codeword. This operation can also be performed without making a matrix multiplication by sequentially checking each parity using XOR operations. The result of the multiplication produces a vector (e.g., a syndrome vector), in which each element corresponds to a specific parity-check equation in the sparse parity-check matrix. A syndrome vector value of zero signifies that the corresponding parity-check equation is satisfied (e.g., no errors or having even number of bit errors in the parity check equation), and a syndrome vector with a non-zero value indicates potential errors impacting the bits involved in the corresponding parity-check equation. Potential errors, for example, may be due to the bits involved in the corresponding parity-check equation being flipped due to noise, interference, distortion, bit synchronization errors or errors from the media itself (both intrinsic and extrinsic). For example, a bit that may have originally been stored as a '0' may be flipped to a '1' or vice versa. The decoding process for LDPC codes are based on the syndrome vector, such as LDPC codes used in the memory sub-systems.

Read operations can be hard reads (1H) or soft reads (as an example 1H2S). A hard read (1H) is formed of hard bits. The "hard bit" in this context is a binary read of data where each bit is read and immediately interpreted as either a '0' or a '1', based on a fixed threshold, a Hard Read Position, HRP, that is based on a distribution of threshold voltages, $V_t$ of the memory device. For example, in NAND flash memory, a voltage level above the HRP might be interpreted as '0', and below the HRP as '1'. Hard reads (1H) are quick and require less computational power than soft reads (1H2S) or (1H1S).

Soft reads (1H2S) or (1H1S) are a combination of a hard bit and soft bits. The "soft bits" provide additional information about the probability or confidence level of the bit being a '0' or '1'. Soft bits are generated through multiple reads at different voltage levels, referred to as soft bit read (SBR) thresholds, around the Hard Read Position, HRP, the voltage used to determine the hard bit. These additional reads with respect to the SBR thresholds help ascertain the likelihood of a state of a cell, providing a gradient of certainty rather than a binary yes/no answer. For example, if a memory cell's voltage is very close to the threshold between a '0' and a '1', the soft bits might indicate a lower confidence in the hard bit's value. Conversely, if the voltage is far from the threshold, the soft bits would indicate higher confidence.

This additional information can be represented in terms of likelihoods or probabilities, which can be converted into likelihood log ratios (LLRs) for use in decoding algorithms, such as an LDPC decoding algorithm. Soft reads (such as 1H2S) are employable in error correction because soft reads (such as 1H2S) allow a decoder algorithm to make more informed decisions based on the degree of certainty about each bit's state. The combination of 1H2S forming the soft read is effective in systems where both speed and data integrity are considered. The hard read forming the hard bit provides a quick initial assessment of each bit, and the soft bits offer deeper insights into the potential errors, enhancing the error correction capability of a decoder.

Compression of data transferred through an Open NAND Flash Interface (ONFI) to a memory subsystem controller (referred to more simply as a controller) in NAND flash memory systems serves as a method to reduce the volume of data transferred from a memory device implementing NAND flash memory to the controller. This process enhances data handling efficiency, reduces latency and tunes bandwidth utilization across the memory sub-system.

ONFI is a standard defining the interface for NAND flash memory devices. ONFI ensures compatibility and efficient communication between different manufacturers' NAND flash products and controllers. Data can be organized in pages and blocks within NAND flash memory. Data is read and potentially compressed directly on memory chips (memory integrated circuit (IC) chips) of the memory sub-system. This on-chip compression reduces the data volume before the data traverses the ONFI. Once compressed, this data utilizes less bandwidth for transfer, potentially accelerating the transfer process and alleviating the system's interface load. Upon receipt, the controller decompresses this data, preparing the for further processing or error correction. Utilizing on-chip compression not only curtails bandwidth usage but also boosts overall system performance by enabling quicker access times and reducing power consumption. However, challenges such as increased complexity and processing overhead for compression and decompression must be managed to prevent impacts on controller performance.

Selecting the SBR thresholds in memory sub-systems, such as NAND flash memory, impacts the compression of data, especially when dealing with soft bit reads. SBR thresholds determine the voltage levels at which additional reads are performed to gather soft information about the stored data. As noted, this soft information provides a measure of confidence or probability regarding the state of each bit, enhancing error correction capabilities. Accordingly, the positioning of these SBR thresholds impacts the amount of soft information generated and a subsequent compressibility of the soft data.

If SBR thresholds are set such that the resulting soft bits have a high variability (i.e., the probability of a soft bit being 0 or 1 is nearly equal), making the data less compressible. Conversely, if SBR thresholds are positioned such that most soft bits consistently lean towards a particular value (low variability), the data becomes more compressible.

The tuning of SBR thresholds involves balancing the need for sufficient soft information to improve error correction with the need to maximize data compressibility. This balance is needed because while more detailed soft information can improve error correction, this extra soft information might reduce compressibility. Conversely, narrower spacing of SBR thresholds might increase compressibility but at the cost of reduced error correction capability.

Mutual information, MI is a concept from information theory that measures an amount of information shared between two random variables, quantifying a reduction in uncertainty about one variable given the knowledge of the other. In practical terms, MI assesses how well one can predict the value of one variable by knowing the value of another. This metric is particularly useful in memory sub-systems, such as NAND flash memory and/or communication systems, where MI facilitates evaluation of an effectiveness of data transmission or storage processes in preserving the information content of the data. In the context of memory sub-systems, MI is used to determine how effectively the data read from the memory chips (including errors introduced by the physical medium and read process) represents the original data written to the memory chips. This is employed for adjusting read and write strategies, including the setting of voltage thresholds for reading data bits. Calculation of the MI is based in part on the soft information, such that the MI accurately reflects the true information content retained in the read process. Thus, adjusting the SBR thresholds impacts the MI.

The selection of the SBR thresholds considers the specific restraints of the memory sub-system including a desired balance between error correction strength and the efficiency of data storage and transfer. Systems that prioritize fast data transfer and efficient storage might opt for SBR thresholds that increase data compressibility, while systems that prioritize data integrity might choose thresholds that enhance the generation of reliable soft information. Effective management of the SBR thresholds enables tuning a trade-off between error correction capabilities and the efficiency of data compression, impacting the overall performance and efficiency of the memory sub-system.

Error correction capability refers to the ability of error correction codes (ECC) to identify and correct errors that occur during data storage and retrieval. This capability is employed for maintaining data reliability. Compression ratio measures an extent to which data can be compacted without significant loss of information, facilitating efficient data storage and transfer.

In some examples provided, the SBR thresholds are selected with a cost function that provides a mathematical framework designed to evaluate and balance multiple performance metrics that can be characterized in performance data. The cost function integrates factors such as the MI, the error correction capability and the compression ratio to guide the selection of the SBR thresholds. In some examples, the cost function is formulated as a weighted sum of these components, where each weight reflects the relative importance of that factor in overall system performance.

The selection of the SBR thresholds includes calculating this cost function for various settings of the SBR thresholds and selecting a configuration that yields a greatest cost. This process often includes making iterative adjustments and simulations to fine-tune the SBR thresholds based on real-time performance data. The cost function enables balancing the trade-offs between these objectives; for example, maximizing MI might compromise the compression ratio. The weights in the cost function help manage these trade-offs by prioritizing certain performance aspects according to the specific operational needs of the system. By employing this method, the memory sub-systems can balance reliability, efficiency and data integrity.

FIG. 1A illustrates a system 100 that includes a memory sub-system 110 that can be a storage device, a memory module or a hybrid of a storage device and a memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card and a hard disk drive (HDD). Examples of memory modules include a dual in-line memory module (DIMM), a small outline DIMM (SO-DIMM) and various types of non-volatile dual in-line memory modules (NVDIMMs).

The system 100 can be a computing device such as a desktop computer, laptop computer, network server, mobile device, a vehicle (e.g., airplane, drone, train, automobile or other conveyance), Internet of Things (IoT) enabled device, embedded computer (e.g., one included in a vehicle, industrial equipment or a networked commercial device) or such computing device that includes memory and a processing device. The system 100 can include a host system 120 that is coupled to one or more memory sub-systems 110. In some examples, the host system 120 is coupled to different types of the memory sub-system 110. FIG. 1A illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller) and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory device(s) 130) when the memory sub-system 110 is coupled with the host system 120 by the physical host interface (e.g., PCIe or CXL bus). The physical host interface can provide an interface for passing control, address, data and other signals between the memory sub-system 110 and the host system 120. FIG. 1A illustrates a memory sub-system 110 as an example. In general, the host system 120 can access multiple memory sub-systems via a same communication connection, multiple separate communication connections and/or a combination of communication connections.

The memory device 130 and the memory device 140 are implemented as non-transitory computer readable media. The memory device 130 and the memory device 140 can include any combination of the different types of non-volatile memory devices and/or volatile memory devices. The volatile memory devices (e.g., the memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include Not-AND (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 include one or more arrays of memory cells. One type of memory cell, for example, single level cells (SLC) can store one bit per cell. Other types of memory cells, such as multi-level cells (MLCs), triple level cells (TLCs), quad-level cells (QLCs) and penta-level cells (PLC's) or higher, can can store multiple bits per cell. In some examples, each of the memory devices 130 can include one or more arrays of memory cells such as SLCs, MLCs, TLCs, QLCs or some combination thereof. In some examples, a particular memory device can include an SLC portion, an MLC portion, a TLC portion and/or a QLC portion of memory cells. The memory cells of the memory devices 130 can be grouped as pages that can refer to a logical unit of the memory device used to store data. In some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-OR (NOR) flash memory, electrically erasable programmable read-only memory (EEPROM), etc.

A memory sub-system controller 115 (or controller 115 for simplicity) communicates with the memory device(s) 130 to perform operations such as reading data, writing data or erasing data at the memory devices 130 and other such operations. The memory sub-system controller 115 can include hardware such as one or more integrated circuits and/or discrete components, a buffer memory or some combination thereof. The hardware can include a digital circuitry with dedicated (e.g., hard-coded) logic to perform the operations described herein. The memory sub-system controller 115 can be a microcontroller, special purpose logic circuitry (e.g., a field programmable gate array (FPGA), an application specific integrated circuit (ASIC), etc.) or other suitable processor.

The memory sub-system controller 115 can include a processing device, which includes one or more processors (e.g., the processor 117), configured to execute instructions stored in a local memory 119. In the illustrated example, the local memory 119 of the memory sub-system controller 115 includes an embedded memory configured to store instructions for performing various processes, operations, logic flows and routines that control operation of the memory sub-system 110, including handling communications between the memory sub-system 110 and the host system 120. The local memory 119 is a non-transitory computer-readable medium.

In some examples, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another example, a memory sub-system 110 does not include a memory sub-system controller 115 and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations and address translations between a logical address (e.g., a logical block address (LBA), namespace) and a physical address (e.g., physical block address) that are associated with the memory devices 130. The memory sub-system controller 115, for example, may employ a Flash Translation Layer (FTL) to translate logical addresses to corresponding physical memory addresses, which can be stored in one or more FTL mapping tables. In some instances, the FTL mapping table can be referred to as a logical-to-physical (L2P) mapping table storing L2P mapping information. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. For example, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in concert with the memory sub-system controller 115 to execute operations on one or more memory cells of the memory devices 130. An external controller (e.g., the memory sub-system controller 115) can externally manage the memory device 130 (e.g., perform media management operations on the memory device 130). In some examples, the memory sub-system 110 is a managed memory device, which is a raw memory device 130 having control logic (e.g., local media controller 135) on the die and a controller (e.g., the memory sub-system controller 115) for media management within the same memory device package. An example of a managed memory device is a managed NAND (MNAND) device.

In some example, the memory device 130 and the memory device 140 comply with standards set forth by the Open Nand Flash Interface (ONFI) Working group, such that the local media controller 135 is consider a constituent component of an ONFI 137 that transfers data from memory cells of the memory device 130 to the memory sub-system controller 115.

The memory device 130 and the memory device 140 are structured to include wordlines. Wordlines are addressable wiring lines that connect and control a row of memory cells in the memory device 130 and the memory device 140. Each wordline addresses the cells in a corresponding row contemporaneously, enabling operations such as reading, writing and erasing data. The memory device 130 and the memory device 140 can be organized into an array of cells arranged in blocks, with each block containing multiple pages. The cells in a page are connected by these wordlines horizontally and bitlines vertically, forming a grid-like structure that allows for efficient data access and management.

In various examples, the memory sub-system 110 includes an error-handling module 113 that executes an error-handling of data read from the memory device 130 and/or the memory device 140. In operation, the host system 120 manages and controls the flow of data between itself and the memory sub-system 110, ensuring efficient data storage and retrieval operations. More generally, the host system 120 employs the memory sub-system 110 to write data to and read data from the memory sub-system 110. For instance, the host system 120 processes these request for reading and/or writing data by interacting with the memory sub-system 110, managing the flow of data to and from the memory device 130 and/or the memory device 140 within the memory sub-system 110. This reading and writing of data enables operation of computing systems where data access and management is needed. In various examples, the memory sub-system 110 also includes a parameter selector 144 that can set threshold voltages for reading and writing data to and from the memory device 130 and the memory device 140.

Figure 1B:
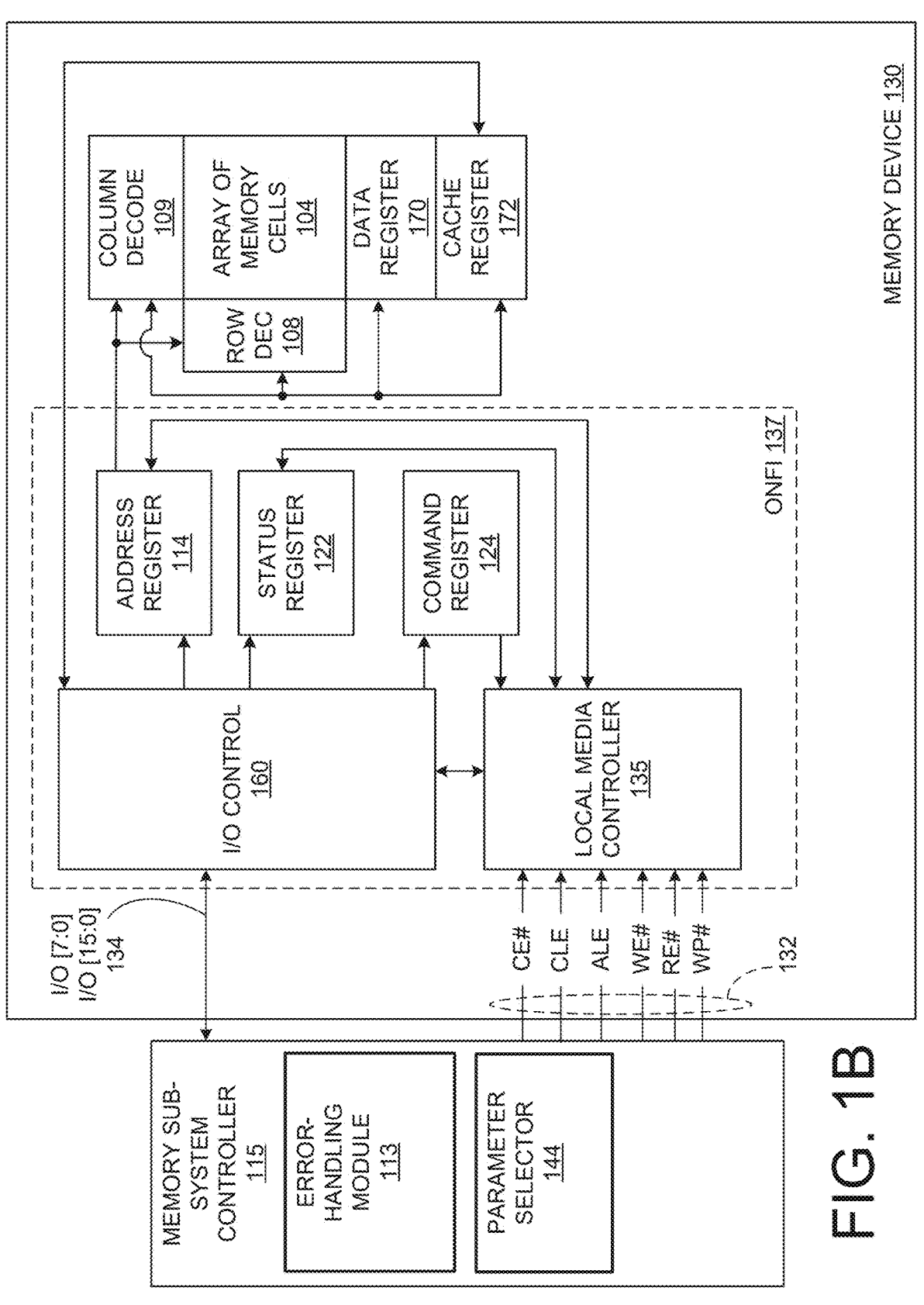
FIG. 1B illustrates a simplified block diagram of an example memory device in communication with a memory sub-system controller.

FIG. 1B illustrates a simplified block diagram of an example of a first apparatus, in the form of a memory device 130, in communication with an example of a second apparatus, in the form of a memory sub-system controller 115 of a memory sub-system (e.g., the memory sub-system 110 of FIG. 1A). Some examples of electronic systems include personal computers, personal digital assistants (PDAs), digital cameras, digital media players, digital recorders, games, appliances, vehicles, wireless devices, mobile telephones, etc. The memory sub-system controller 115 (e.g., a controller external to the memory device 130), can be a memory controller or other external host device.

The memory device 130 includes an array of memory cells 104 logically arranged in rows and columns. The memory cells 104 form a non-transitory computer-readable medium. Memory cells of a logical row are connected to the same access line (e.g., a wordline) while memory cells of a logical column are selectively connected to the same data line (e.g., a bit line) in some examples. In some examples, a single access line is associated with more than one logical row of memory cells and a single data line may be associated with more than one logical column. Memory cells (not shown in FIG. 1B) of at least a portion of the array of memory cells 104 are capable of being programmed to one of at least two target data states.

The memory device 130 includes row decode circuitry 108 and column decode circuitry 109 for decoding address signals. Address signals are received and decoded to access an array of memory cells 104 of the memory device 130. The memory device 130 also includes input/output (I/O) control circuitry 160 to manage input of commands, addresses and data to the memory device 130 as well as output of data and status information from the memory device 130. The memory device 130 has an address register 114 and is in communication with the I/O control circuitry 160, the row decode circuitry 108 and the column decode circuitry 109 to latch the address signals prior to decoding. The memory device 130 also includes a command register 124 in communication with the I/O control circuitry 160 and a local media controller 135 (e.g., the local media controller 135 of FIG. 1A) to latch incoming commands.

A controller (e.g., the local media controller 135 internal to the memory device 130) controls access to the array of memory cells 104 in response to the commands and generates status information for the external memory sub-system controller 115. For example, the local media controller 135 is configured to perform access operations (e.g., read operations, programming operations and/or erase operations) on the array of memory cells 104. The local media controller 135 is in communication with the row decode circuitry 108 and the column decode circuitry 109 to control the row decode circuitry 108 and the column decode circuitry 109 in response to the addresses.

The local media controller 135 is also in communication with a cache register 172. The cache register 172 latches data, either incoming or outgoing, as directed by the local media controller 135 to temporarily store data while the array of memory cells 104 is busy writing or reading, respectively, other data. During a program operation (e.g., write operation), data is passable from the cache register 172 to the data register 170 for transfer to the array of memory cells 104, and new data can be latched in the cache register 172 from the I/O control circuitry 160. During a read operation, data is passable from the cache register 172 to the I/O control circuitry 160 for output to the memory sub-system controller 115. New data is passable from the data register 170 to the cache register 172. The cache register 172 and/or the data register 170 form (e.g., or form a portion of) a page buffer of the memory device 130. The page buffer includes sensing devices (not shown in FIG. 1B) to sense a data state of a memory cell of the array of memory cells 104. For example, the sensing devices sense a state of a data line connected to that memory cell. The memory device 130 also includes a status register 122 in communication with the I/O control circuitry 160 and the local memory controller 135 to latch the status information for output to the memory sub-system controller 115. The memory sub-system controller 115 includes the error-handling module 113 and the parameter selector 144.

The memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #and/or a write protect signal WP #. Additional or alternative control signals (not shown) can be further received over a control link 132 depending upon the nature of the memory device 130. In some examples, the memory device 130 receives command signals (which represent commands), address signals (which represent addresses) and data signals (which represent data) from the memory sub-system controller 115 over a multiplexed input/output (I/O) bus 134 and outputs data to the memory sub-system controller 115 over the I/O bus 134.

In some examples, the commands are received over input/output (I/O) pins [7:0] of the I/O bus 134 at I/O control circuitry 160 and may then be written into the command register 124. The addresses are received over input/output (I/O) pins [7:0] of the I/O bus 134 at I/O control circuitry 160 and written into the address register 114. The data is receivable over input/output (I/O) pins [7:0] for an 8-bit device or input/output (I/O) pins [15:0] for a 16-bit device at I/O control circuitry 160 and is writable into the cache register 172. The data is subsequently written into the data register 170 for programming the array of memory cells 104 in some examples.

In some examples, the cache register 172 is omitted, and in such examples, the data is written directly into the data register 170. Additionally or alternatively, data is output over input/output (I/O) pins [7:0] for an 8-bit device or input/output (I/O) pins [15:0] for a 16-bit device. Moreover, it is noted that although reference is made to I/O pins, in other examples, a different conductive node providing for electrical connection to the memory device 130 by an external device (e.g., the memory sub-system controller 115), such as conductive pads or conductive bumps could be used in addition to or as a replacement for the I/O pins.

In some examples, the I/O control circuitry 160, the local media controller 135, the address register 114, the status register 122 and the command register 124 are constituent components of the ONFI 137. Additionally, in other examples, the ONFI 137 includes more or fewer components than that shown. The ONFI 137 facilitates a transfer of data from the memory cells 104 to the memory sub-system controller 115. Thus, the rate of data transfer between the memory cells 104 and the memory sub-system controller 115 is a bottleneck on the performance of the memory device 130. Accordingly, the parameter selector 144 is configured to select parameters, such as voltage thresholds to curtail an impact of the bottleneck.

The example memory device 130 of FIG. 1B has been simplified. Moreover, in other examples, the functionality of the various block components described with reference to FIG. 1B are not segregated to distinct components or component portions of an integrated circuit device. For example, a single component or component portion of an integrated circuit device could be adapted to perform the functionality of more than one block component of FIG. 1B. Alternatively, components or component portions of an integrated circuit device could be combined to perform the function-ality of a single block component of FIG. 1B. Additionally, while specific I/O pins are described in accordance with popular conventions for receipt and output of the various signals, it is noted that other combinations or numbers of I/O pins (or other I/O node structures) are useable in various examples.

The parameter selector 144 of the memory sub-system controller 115 selects soft bit read (SBR) thresholds utilized during soft reads (1H2S) or (1H1S) of the memory device 130 or the memory device 140. The soft reads are formed of a combination of hard bits and soft bits.

The "hard bits" in this context is a voltage read where each bit is read and immediately interpreted as either a '0' or a '1', based on a fixed threshold, which is referred to as a Hard Read Position, HRP. In the present examples, volt-ages below the HRP are interpreted as '1' and voltages above the HRP are interpreted as a '0'. The "soft bits" provide additional information about the probability or confidence level of the bit being a '0' or '1'. Soft bits are generated through multiple reads at different voltage levels, referred to as soft bit read (SBR) thresholds, around the Hard Read Position, HRP, the voltage used to determine the hard bit. These additional reads with respect to the SBR thresholds help ascertain the likelihood of a state of a cell, providing a gradient of certainty rather than a binary yes/no answer.

The HRP is based on a distribution of threshold voltages, $V_t$ across the cells of the memory device 130 and the memory device 140. Hard reads (1H) are quick and require less computational power than soft reads (1H2S) or (1H1S) but provide less information about the reliability of the read bit. The threshold voltage, $V_t$ and the HRP, are determined through a combination of the physical properties of the memory cells, manufacturing processes, and operational algorithms that optimize data integrity and read efficiency. The threshold voltage, $V_t$ is primarily influenced by the physical and chemical characteristics of the semiconductor material used in the memory cells, as well as the manufac-turing techniques employed to create these cells. These manufacturing techniques, which involve specific doping and layering processes, calibrate the electrical properties of the cells to achieve desired threshold voltage levels that reliably represent different data states. In NAND flash memory, data is stored by altering the amount of charge in the floating gate of each memory cell, with different charge levels corresponding to different data states, particularly in multi-level cell (MLC) and triple-level cell (TLC) technolo-gies.

The local memory 119 includes data characterizing stress tests executed on the memory device 130 and the memory device 140. These stress tests involve stressing the memory device 130 and the memory device 140 to a trigger rate of a performance path. The performance path refers to a route through that data is processed and managed in high-demand scenarios, such as in high-performance computing or real-time applications where speed and efficiency are critical. Moreover, the trigger rate of the testing specifies a frequency at which operations such as data reads, writes and error corrections are initiated within the memory device 130 and the memory device 140. This data is employed by the parameter selector 144 to facilitate selection of the Hard Read Position, HRP.

More particularly, the Hard Read Position, HRP, is deter-mined by analyzing the distribution of threshold voltages, $V_t$ across a population of memory cells of the memory device 130 and the memory device 140. This analysis involves characterization tests and the use of algorithms that assess the distributions of the threshold voltages, $V_t$ to identify a tuned read voltage that curtails read errors. The goal in selecting the HRP is to set a read voltage that discriminates between the different states of the cells, thereby curtailing the raw bit error rate (RBER) during the read process. In some examples, the memory sub-system controller 115 executes adaptive read algorithms that dynamically adjusts the HRP based on feedback and observed error rates during operation to compensate for changes in characteristics of memory cells due to factors such as wear and environmental conditions.

Figure 2A:
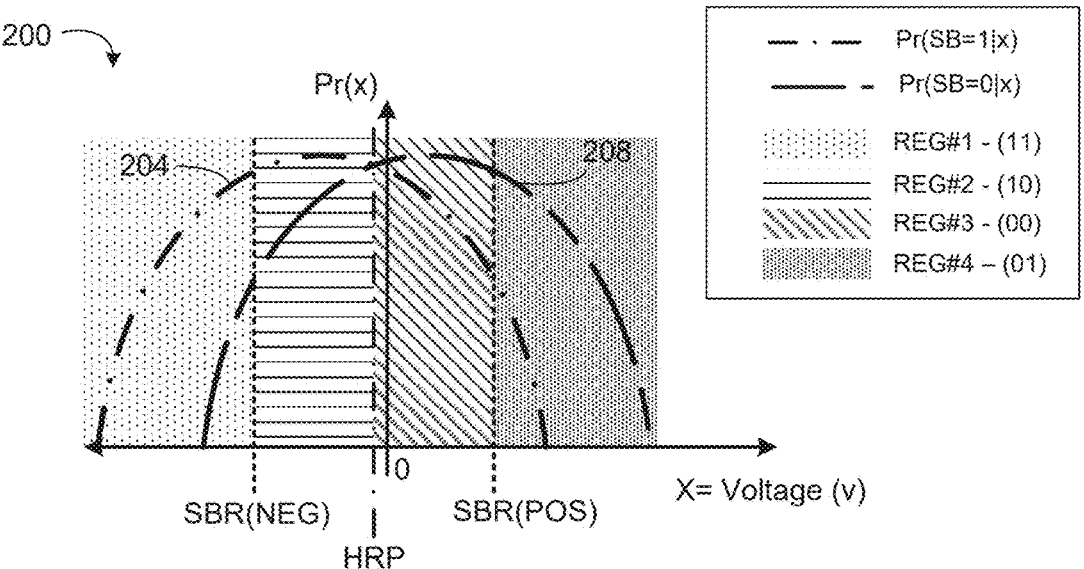
FIG. 2A illustrates a graph depicting a soft read operation that plots probability as a function of voltage read from a memory cell.

As noted with respect to FIG. 1B, the ONFI 137 includes the components that facilitate the transfer of data between the memory device 130 and the memory sub-system controller 115. Accordingly, the rate of data transfer (e.g., bandwidth) across the ONFI 137 is a bottleneck on an operational speed of the memory sub-system 110, and ultimately on the system 100. To curtail the impact of this bottleneck, data stored in the memory device 130 and the memory device 140 is compressed. However, the parameters that dictate a compression ratio for the data stored in the memory device 130 and the memory device 140 are selected by the parameter selector 144. These parameters include soft bit read (SBR) thresholds for the soft read (1H2S) or (1H1S) of the data. FIG. 2A illustrates an example graph 200 demonstrating a threshold voltage distribution of a memory cell which plots probability, Pr as a function of voltage, in volts (V), denoted by 'x'. The graph 200 includes plots 204/208 showing the probability that at a given voltage x, the bit is I/O respectively.

The graph 200 includes a selected Hard Read Position, HRP. Bit reads with a voltage less than the hard read position HRP are assigned a hard bit value of '1' and bit reads with a voltage greater than the hard read position, HRP are assigned a value of '0'. The hard bit can represent a bit value from a hard read (1H). However, as illustrated, bit that have threshold voltages near the hard read position, HRP are almost equally likely to be a '0' as a '1', as demonstrated by the plot 204 and the plot 208. Thus, to introduce additional information to the hard bit (1H), a soft read is executed with SBR (NEG) and SBR (POS) to get a soft bit where the cells that have voltage between SBR (NEG) and SBR (POS) are marked as low reliability, whereas other cells are marked as high reliability. Soft read at SBR (NEG) and SBR (POS) can be executed with a single read comment or with two read comments.

The graph 200 includes a lower soft bit read threshold, SBR (NEG)=HRP+negative offset and a higher soft bit read threshold, SBR (POS)=HRP+positive offset. A single soft read can be performed with SBR (NEG) and SBR (POS) to get a single soft bit where the cells that have voltage between SBR (NEG) and SBR (POS) are marked as low reliability whereas other cells are marked as high reliability. The soft bit is assigned a value of '0' if the read bit has a voltage between SBR (NEG) and SBR (POS). Similarly, the soft bit is assigned a value of '1' if the read bit has a voltage less than SBR (NEG) or more than SBR (POS). When combined with the hard bit value, relative to the HRP, the first soft read and the second soft read indicate whether a voltage of the memory cell is in one of four reliability regions of the graph 200 namely, Region 1 (REG #1), Region 2 (REG #2), Region 3 (REG #3) or Region 4 (REG #4). Each of the four regions has a unique binary number corresponding to one hard bit and one soft bit Table 1 defines an example relationship between the region of the graph 200 that includes the hard read and the soft bit of the soft read (1H1S) and an example reliability.

TABLE 1

| Region | Hard Bit | Soft Bit | Reliability |
|--------|----------|----------|-------------|
| 1 | 1 | 1 | High |
| 2 | 1 | 0 | Low |
| 3 | 0 | 0 | Low |
| 4 | 0 | 1 | High |

The example provided in Table 1 can be different in other schemes. Additionally, in other examples, there could be more than 1 soft bit included in a soft read (such as 1H2S), such that there could be more than two levels of reliability.

As illustrated in the graph 200, selection of the SBR thresholds, namely the negative soft bit read threshold, SBR (NEG) and the positive soft bit read threshold, SBR (POS) impacts which bits would be assigned a high or low reliability. Additionally, the selection of the SBR thresholds impacts a compressibility of soft information from the soft read (1H1S).

Figure 2B:
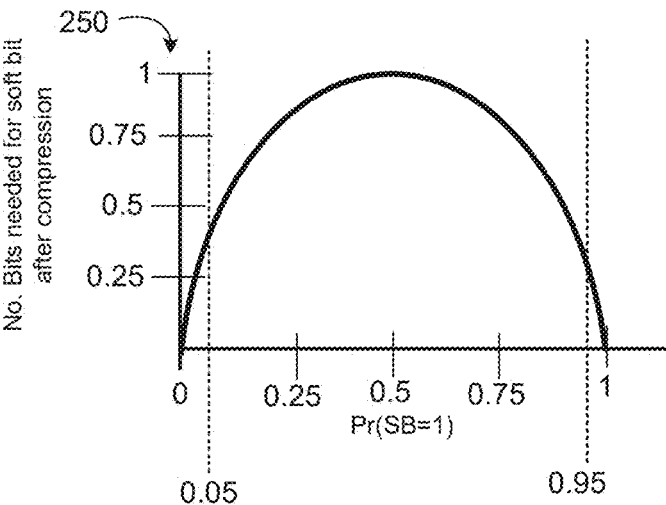
FIG. 2B illustrates a graph that plots a number of bits needed after compression as a function of probability of a bit being a '1'.

FIG. 2B illustrates a graph 250 that plots a number of bits needed to represent a soft bit after compression as a function of probability that a bit read from a memory cell is a '1'. It is noted that the same graph (or nearly the same) could be used for the probability that the bit read from the memory cell is a '0'. As illustrated, the areas where there is less certainty (e.g., Pr(SB=1) is 0.05 or 0.95 which indicates that a majority of the soft bits have the same value), results in fewer bits needed to represents the soft data after compression (e.g., less than 0.1 bits needed for probabilities of 0.05 or 0.95, which in turn indicates a higher compression ratio), which corresponds to the compression ratio. However, this compression comes at a cost of soft information, as demonstrated in FIGS. 2C and 2D, which correspond to the two extreme cases that for majority of the hard bits, soft bit is the same which enables higher compression ratio but at the expense of lower correction capability as soft bit has little ability to distinguish the bits because the soft bit is mostly the same for majority of the bits.

Figure 2C:
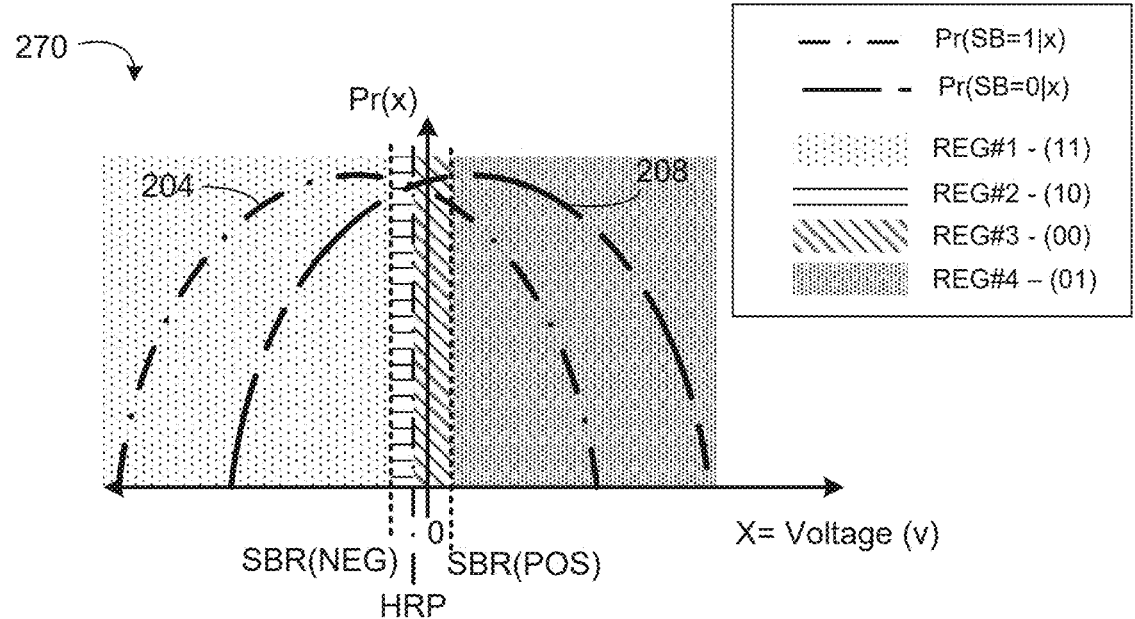
FIG. 2C illustrates a first modified version of the graph illustrated in FIG. 2A.
Figure 2D:
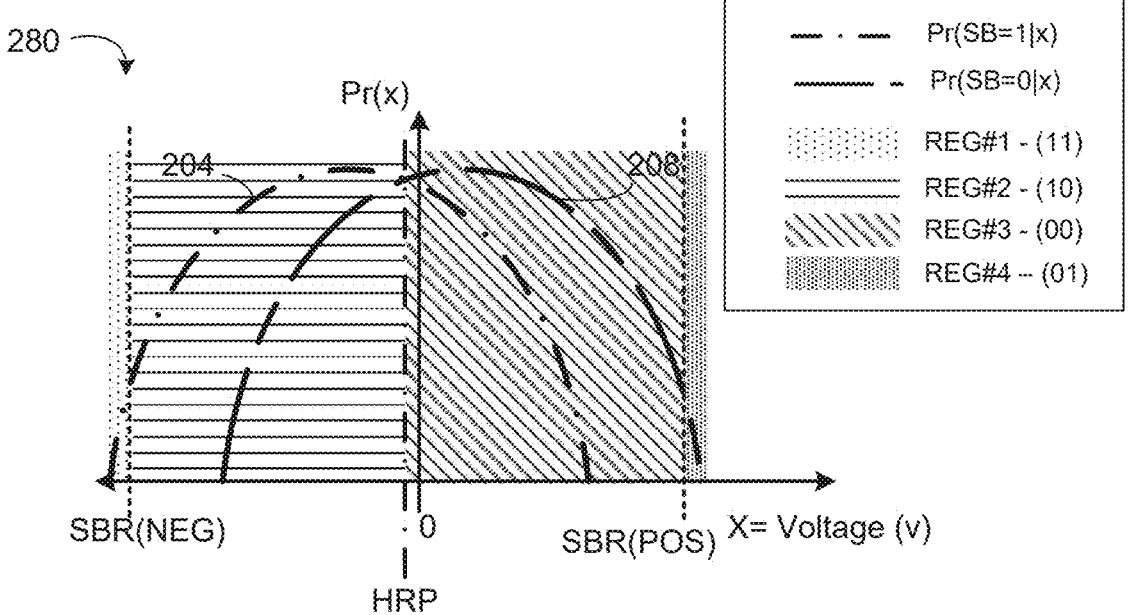
FIG. 2D illustrates a second modified version of the graph illustrated in FIG. 2A.

FIG. 2C illustrates a graph 270 that represents a first version of the graph 200 of FIG. 2A where the negative soft bit read threshold, SBR (NEG) and the positive soft bit read threshold, SBR (POS) are selected such that the compression ratio is near a maximum. FIG. 2D illustrates a graph 280 that represents a second version of the graph 200 of FIG. 2A where the negative soft bit read threshold, SBR (NEG) and the positive soft bit read threshold, SBR (POS) are selected such that the compression ratio is near the maximum.

As illustrated by the graph 270 of FIG. 2C selecting the negative soft bit read threshold, SBR (NEG) and the positive soft bit read threshold, SBR (POS) near the HRP (to increase the compression ratio to a near maximum) significantly reduces the ability of a soft bit to differentiate the bits, since few bits would be in region 2 or region 3, and this decrease in the soft information reduces the correction capability benefit of of the soft read. Similarly, as illustrated by the graph 280 of FIG. 2D, selecting the negative soft bit read threshold, SBR (NEG) and the positive soft bit read threshold, SBR (POS) to be distal from the HRP also significantly reduces the ability of a soft bit to differentiate the bits, since few bits would be in region 1 or region 4, and this also decreases the correction capability benefit of soft information, which in turn reduces a correction capability data read for the soft read (1H1S).

Referring back to FIG. 1A, as demonstrated in FIGS. 2A-2D, selection of the SBR thresholds (SBR (NEG) and SBR (POS) in FIGS. 2A-2D) impacts the compressibility of data (defining the compression ratio) stored in the memory device 130 or the memory device 140, as well as the availability of soft information, which in turns impacts the correction capability of data read from the memory device 130 and the memory device 140. Correction capability in data storage, such as those employing error correction codes (ECC), defines an ability of the memory sub-system 110 to detect and correct errors during the storage, transmission or retrieval of data residing in the memory device 130 or the memory device 140. The correction capability is leveraged to maintain data integrity and reliability in environments susceptible to data corruption due to noise, interference or physical degradation of storage media. The effectiveness of correction capability is typically quantified by a number of errors that can be corrected within a given data block (e.g., a codeword), with more robust systems capable of correcting a higher number of errors. In the memory sub-system 110, a strong correction capability compensates for errors caused by wear, voltage shifts and manufacturing variability. Thus, it is desirable to select the SBR thresholds to balance the compression ratio and the correction capability of the data stored in the memory device 130 and the memory device 140 to ensure efficient operation of the memory sub-system 110.

To determine the SBR thresholds, a parameter selector 144 of the memory sub-system controller 115 is configured to determine the SBR thresholds that result in a maximum mutual information (MI). MI is a concept from information theory that quantifies the amount of information shared between two random variables, demonstrating how knowledge of one variable reduces uncertainty about the other. MI is employed to evaluate the performance of the memory sub-system 110. In this example, MI indicates an effectiveness of how data read from the memory device 130 or the memory device 140 corresponds to the original data written. Values of MI range from zero to one, with higher values indicating greater predictability and reduced uncertainty in the data retrieval process, thus facilitating improved data integrity and performance of the memory sub-system 110.

To determine the SBR thresholds that maximize MI, the parameter selector 144 sweeps the SBR thresholds, SBR (NEG) and SBR (POS) relative to the hard read position, HRP by predefined intervals, such as about 20 millivolts (mV). For instance, consider the example illustrated in FIG. 2A. In this situation, SBR (NEG) and SBR (POS) are tested for the following discrete set of values defined in Equations 1 and 2.

$$SBR\ (NEG) = \qquad\qquad\qquad\qquad \text{Equation 1}$$

$$HRP{-}300\,\text{mV},\ HRP{-}280\,\text{mV},\ ...,\ HRP{-}20\,\text{mV}$$

$$SBR\ (POS) = \qquad\qquad\qquad\qquad \text{Equation 2}$$

$$HRP + 300\,\text{mV},\ HRP + 280\,\text{mV},\ ...,\ HRP + 20\,\text{mV}$$

Values of SBR (NEG) and SBR (POS) are paired together to form a set of SBR thresholds. For example, SBR (NEG) =HRP-200 mV and SBR (POS)=HRP+200 mV could be a particular set of SBR thresholds. Accordingly, Equations 1 and 2 are employable to determine a range of the SBR thresholds, namely a range for pairs of SBR (NEG) and SBR (POS). For each set of SBR (NEG) and SBR (POS), three reads [SBR (NEG), HRP, SBR (POS)] results in four reliability regions, namely REG #1, REG #2, REG #3 and REG #4 as demonstrated with respect to FIG. 2A. Continuing with this example, for each set of values of SBR (NEG) and SBR (POS), the parameter selector 144 computes probabilities that bits are found in the each of the four reliability regions REG #1, REG #2, REG #3 and REG #4 using Equation 3 and Equation 4.

$$Pr\,(\text{bits in } REG\,\#1|\text{bit}=0),\ Pr\,(\text{bits in } REG\,\#2|\text{bit}=0), \qquad \text{Equation 3}$$
$$Pr\,(\text{bits in } REG\,\#3|\text{bit}=0),\ Pr\,(\text{bits in } REG\,\#4|\text{bit}=0)$$

$$Pr\,(\text{bits in } REG\,\#1|\text{bit}=1),\ Pr\,(\text{bits in } REG\,\#2|\text{bit}=1), \qquad \text{Equation 4}$$
$$Pr\,(\text{bits in } REG\,\#3|\text{bit}=1),\ Pr\,(\text{bits in } REG\,\#4|\text{bit}=1)$$

Additionally, for each set of values of SBR (NEG) and SBR (POS), the parameter selector 144 determines a raw bit error rate (RBER) using Equation 5 based on the calculated probabilities.

$$RBER = \qquad\qquad\qquad\qquad\qquad \text{Equation 5}$$
$$Pr\,(\text{bits in } REG\,\#1|\text{bit}=0) + Pr\,(\text{bits in } REG\,\#2|\text{bit}=0) +$$
$$Pr\,(\text{bits in } REG\,\#3|\text{bit}=1) + Pr\,(\text{bits in } REG\,\#4|\text{bit}=1)$$

An entropy of data, E is calculatable using Equation 6 for data X written to the memory device 130 or the memory device 140 or data Y read from memory device 130 or the memory device 140.

$$E(K) = -\sum\nolimits_{x\in K} p(x)\log\,(p(x)) \qquad \text{Equation 6}$$

wherein:
K is data written to or read from a memory device and log operation is in base-2.

The parameter selector 144 is configured to employ Equation 6 to calculate an entropy E(Y) set of values of SBR (NEG) and SBR (POS), with probabilities defined in Equations 7-10.

$$Pr\,(Y \text{ in } REG\,\#1) + Pr\,(\text{bits in } REG\,\#1|\text{bit}=0) + \qquad \text{Equation 7}$$
$$Pr\,(\text{bits in } REG\,\#2|\text{bit}=1)$$

$$Pr\,(Y \text{ in } REG\,\#2) + Pr\,(\text{bits in } REG\,\#2|\text{bit}=0) + \qquad \text{Equation 8}$$
$$Pr\,(\text{bits in } REG\,\#1|\text{bit}=1)$$

$$Pr\,(Y \text{ in } REG\,\#3) + Pr\,(\text{bits in } REG\,\#3|\text{bit}=0) + \qquad \text{Equation 9}$$
$$Pr\,(\text{bits in } REG\,\#4|\text{bit}=1)$$

$$Pr\,(Y \text{ in } REG\,\#4) + Pr\,(\text{bits in } REG\,\#4|\text{bit}=0) + \qquad \text{Equation 10}$$
$$Pr\,(\text{bits in } REG\,\#3|\text{bit}=1)$$

The parameter selector 144 calculates an entropy E(Y|X) for set of values of SBR (NEG) and SBR (POS), using Equation 11.

$$E(Y|X) = E(Y|X = 0) + E(Y|X = 1) \qquad \text{Equation 11}$$

wherein:

E(Y|X=0) is calculated with Pr(bits in REG #1|bit=0), Pr(bits in REG #2|bit=0), Pr(bits in REG #3| bit=0), Pr(bits in REG #4| bit=0); and E(Y|X=0) is calculated with Pr(bits in REG #1| bit=1), Pr(bits in REG #2| bit=1), Pr(bits in REG #3| bit=1), Pr(bits in REG #4 bit=1)

The parameter selector 144 calculates the MI based on the entropy E(Y) and the entropy E(Y|X) using Equation 12 for each set of values of SBR (NEG) and SBR (POS).

$$MI = E(Y) - E(Y|X) \qquad \text{Equation 12}$$

The parameter selector 144 is configured to identify the SBR thresholds as a set of values of SBR (NEG) and SBR (POS) that provide a maximum mutual information, $MI_{Max}$. However, if the SBR thresholds, SBR (NEG) and SBR (POS) are selected to achieve $MI_{Max}$ without regard for other constraints, a correction capability, CC of the memory sub-system 110 may be greater than what is needed for efficient operation of the memory sub-system 110. For instance, if the data stored in the memory device 130 and the memory device 140 is not compressed, two codewords worth of data is needed to decode one codeword, which increases latency of the memory sub-system 110. Additionally, during the operations for identifying the SBR thresholds as a set of values of SBR (NEG) and SBR (POS) for $MI_{Max}$, the parameter selector 144 also determines a range for the SBR thresholds (e.g., a range of a set of values of the SBR thresholds, as defined in Equations 1 and 2) and a range for the mutual information, MI, such that MI is greater than or equal to zero and less than or equal to $MI_{MAX}$.

Accordingly, responsive to identifying the set of values of SBR (NEG) and SBR (POS) that provide $MI_{Max}$, the parameter selector 144 computes a range of theoretical compression ratios, $CR_{TH}$ for the range of SBR thresholds. $CR_{TH}$ in the context of data storage (and transmission) refers to a maximum possible reduction in data size that can be achieved through compression algorithms, based on an entropy of the data. $CR_{TH}$ is needed for understanding how efficiently data can be compressed without losing information.

To determine the theoretical compression ratio $CR_{TH}$, the parameter selector 144 determines probabilities that a given bit read from the memory device 130 or the memory device 140 is a weak bit (e.g., a bit with a low reliability) or a strong bit (e.g., a bit with a high reliability). Weak bits are read from region 2 (REG #2) or region 3 (REG #3) as demonstrated in FIGS. 2A, 2C and 2D. The parameter selector 144 can employ Equation 13 and 14 to determine the probabilities of weak bits, Pr(weak bits) and strong bits, Pr(strong bits) for each set of values of SBR (NEG) and SBR (POS) in the range of SBR thresholds.

$$Pr\,(\text{weak bits}) = \qquad \text{Equation 13}$$
$$Pr\,(\text{bits in } REG\,\#2|\text{bit} = 0) + Pr\,(\text{bits in } REG\,\#3|\text{bit} = 0) +$$
$$Pr\,(\text{bits in } REG\,\#2|\text{bit} = 1) + Pr\,(\text{bits in } REG\,\#3|\text{bit} = 1)$$

$$Pr\,(\text{strong bits}) = 1 - Pr\,(\text{weak bits}) \qquad \text{Equation 14}$$

The parameter selector 144 employs the Pr(weak bits) and Pr(strong bits) to define a strong-weak vector, $P_{strongweak}=$

[Pr(weak bits), Pr(strong bits)]. The parameter selector 144 employes Equation 6 to calculate the entropy, E for the strong-weak vector, $P_{strongweak}$, which defines $CR_{TH}$. Accordingly, in terms of percentage compression ratio $CR_{TH}$ can be calculated by the parameter selector 144 with Equation 15 where $E(P_{strongweak})$ computes the number of bits needed to represent the compressed data, i.e., smaller $E(P_{strongweak})$ shows higher compression whereas higher $E(P_{strongweak})$ shows lower compression. As an example, in situations where Pr(weak bits)=0.5 and Pr(strong bits)=0.5 then $E(P_{strongweak})$=1, indicating a 100×(1-1)=0 compression ratio, i.e., zero compression given that strong and weak bits are equally likely. Also, in situations where Pr(weak bits)=0.995 and Pr(strong bits)=0.005 then $E(P_{strongweak})$ =0.0454, indicating that only 0.0454 bits are needed to represent the compressed data. In such a situations, suppose that there are 1000 bits compressed such that there would be 1000×0.0454=46 bits after compression and for this case the compression ratio is 100×(1−0.0454)=95.4585%.

$$CR_{TH} = 100 * (1 - E(P_{strongweak})) \qquad \text{Equation 15}$$

The theoretical compression ratio with the greatest value is referred to as a maximum theoretical compression ratio, $CR_{Max}$. Thus, the theoretical compression ratio, $CR_{TH}$ has a range, such that $CR_{TH}$ is greater than or equal to zero and less than or equal to $CR_{Max}$.

Responsive to identifying the range of the mutual information, MI and the range of theoretical compression ratio, $CR_{TH}$, the parameter selector 144 can employ a cost function, C (x) to select the SBR thresholds, SBR (NEG) and SBR (POS) to tune performance of the memory sub-system 110.

The cost function, C(X) is employable to determine a cost that is based on a selected mutual information, MI, a selected compression ratio, CR and in some examples a selected correction capability, CC. The compression ratio, CR defines an amount that data in the memory device 130 or the memory device 140 is compressed. For instance, a CR of 90% indicates that data will be compressed to 10% of an original size of the data, and a CR of 70% indicates that the data will be compressed to 30% of the original size of the data. The selected compression ratio, CR is less than or equal to the maximum theoretical compression ratio, $CR_{Max}$.

Each selected mutual information, MI has a corresponding set of values for SBR thresholds, SBR (NEG) and SBR (POS) as explained. Similarly, as explained, each set of values for SBR thresholds, SBR (NEG) and SBR (POS) correspond to a particular (selected) compression ratio, CR. Thus, the selected MI also corresponds to the selected CR. That is the selected MI and the selected CR correspond to the same SBR thresholds (e.g., a specific set of SBR (NEG) and SPR (POS)).

The selected mutual information, MI is greater than or equal to zero and less than the maximum mutual information, $MI_{Max}$. In general, better performance is achieved by increasing the selected CR and the selected MI. However, as demonstrated, an increase in CR might lead to a decrease in MI. Thus, the cost function, C(X) balances these competing interests.

In the present examples, it is presumed that each codeword read from the memory device 130 or the memory device 140 includes user data and a parity codeword (parity bits) for an LDPC decoder. The correction capability of the LDPC decoder is predetermined based on Monte-Carlo simulations of an LDPC code for the LDPC decoder. As some examples, the correction capability of the LDPC decoder can be a RBER of 0.02, 0.009, etc., indicating that the LDPC decoder can correct a bit error rate of about 0.009 resulting a certain codeword error rate (CWER) of about 1E-9. This also indicates that for a simulation of 1E9 codewords with an average bit error rate of 0.009, the LDPC decoder will fail to correct 1 of the 1E9 codewords resulting CWER=1/1E9=1E-9. Moreover, the correction capability can vary with the SBR thresholds.

The parameter selector 144 employs a first version of the cost function, C1(MI,CR) or a second version of the cost function C2(MI,CC,CR) to select the SBR thresholds that maximizes the cost output by the corresponding cost function, C1(MI,CR) or C2(MI,CC,CR). The first version of the cost function can be defined with Equation 16.

$$C1\,(MI,\,CR) = w1\,(MI)*MI + w1\,(CR)*CR \qquad \text{Equation 16}$$

wherein:
MI is a selected mutual information is greater than or equal to 0 and less than or equal to $MI_{Max}$, where larger MI is better;
CR is a selected compression that greater than or equal to 0 and less than or equal to $CR_{Max}$, where larger CR is better;
w1 (MI) is a weight of the MI and w1 (MI) is greater than 0; and
w1 (CR) is a weight of the CR and w1 (CR) is greater than 0.

The weights, w1 (MI) and w1 (CR) of the first version of the cost function, C1(MI,CR), are determined by simulation to ensure that the performance of the memory sub-system 110 meets performance specifications for sustained read throughput of data traversing the ONFI 137.

In some examples, the parameter selector 144 is configured to use the second version of the cost function C2(MI, CC, CR) that can be defined with Equation 17.

$$C2\,(MI,\,CC,\,CR) = \qquad\qquad\qquad \text{Equation 17}$$
$$w2\,(MI)*MI + w2\,(CC)*CC + w2\,(CR)*CR$$

wherein:
MI is a selected mutual information is greater than or equal to 0 and less than or equal to $MI_{Max}$, where larger MI is better;
CC is the correction capability of a selected LDPC code and a larger CC is better;
CR is a selected compression that greater than or equal to 0 and less than or equal to $CR_{Max}$, where larger CR is better;
w2 (MI) is a weight of the MI and w2 (MI) is greater than 0; and
w2 (CR) is a weight of the CR and w2 (CR) is greater than 0; and
w2 (CC) is a weight of the CC and w2 (CC) is greater than 0.

The weights of the second cost function, C2(MI,CC,CR), w2 (MI), w2 (CC) and w2 (CR) are determined by simulation to ensure that the performance of the memory sub-system 110 meets performance specifications for sustained read throughput of data traversing the ONFI 137. Additionally, the first version of the cost function C1(MI,CR) and the second version of the cost function, C2(MI,CC,CR) can use different weight values, such that in some examples w1 (MI) and w2 (MI) are different values, and w1 (CR) and w2 (CR) are different values.

The parameter selector 144 can use either the first version of the cost function C1(MI,CR) or the second version of the cost function C2(MI,CC,CR) to determine the selected SBR thresholds, SBR (NEG) and SBR (POS) that have the greatest cost. In particular, for each set of SBR thresholds (defined in Equations 1 and 2), the parameter selector 144 calculates a corresponding selected MI and a corresponding selected CR. The SBR thresholds, SBR (NEG) and SBR (POS) that correspond to the selected MI and the selected CR with the greatest cost are selected by the parameter selector 144 as the SBR thresholds that have employed for soft reads (1H2S) or (1H1S).

In another example rather than employing the cost function, the parameter selector 144 can be configured to base the selection of the SBR thresholds operational specifications of the memory sub-system 110 incorporating the memory device 130 and the memory device 140. In such a situation, the parameter selector 144 may be preprogrammed (or have data stored in the local memory 119) with a minimum target compression ratio, $CR_{TAR}$. In this situation, the SBR thresholds are set to values that provide a greatest correction capability, CC while still achieving the target minimum compression ratio, $CR_{TAR}$. Alternatively, the parameter selector 144 may be programmed with a minimum target correction capability, $CC_{TAR}$. In this situation, the SBR thresholds are set to values that provide a greatest compression ratio, CR while still achieving the minimum target correction capability, $CC_{TAR}$.

In operation, suppose that the host system 120 outputs a read memory command to the memory sub-system controller 115. In response to the read request the memory sub-system controller 115 operates in concert with the local media controller 135 to execute a hard read (1H) or a soft read (1H2S) or (1H1S) of the memory cells of the memory device 130 and/or the memory device 140 specified in the read memory command. Additionally, in examples where the soft read (1H2S) or (1H1S) is executed, the memory sub-system controller 115 employs the selected SBR thresholds for the soft bits, and the HRP for the hard bits. The memory sub-system controller 115 stores retrieved data in the form of a codeword formed of user data and a parity codeword (e.g., LDPC codewords formed of a combination of embedded data and parity bits) in the local memory 119.

The error-handling module 113 employs an LDPC decoder to correct errors in the codeword. In response to correction of the errors, the error-handling module 113 stores the corrected codeword in the local memory 119. In some examples, the memory sub-system controller 115 extracts the user data from the codeword and provides the host system 120 with the user data in response to the read request. In other examples, the memory sub-system controller 115 provides the entire codeword to the host system 120 in response to the read request.

Over time, if performance data monitored by the memory sub-system controller 115 indicates that the error-handling module 113 is unable to correct errors sufficiently and/or if a data throughput of the ONFI 137 from the memory device 130 or the memory device 140 to the memory sub-system controller 115 falls below targets, the parameter selector 144 can dynamically adjust the SBR thresholds, SBR (NEG) and SBR (POS) to improve the performance of the memory sub-system 110. This can be achieved, for example by adjusting the weights in the first version of the cost function C1(MI,CR) or the second version of the cost function C2(MI,CC,CR), and re-executing the respective cost function, C1(MI,CR) or C2(MI,CC,CR) periodically and/or asynchronously.

By utilizing the memory sub-system 110, the SBR thresholds are selected by the parameter selector 144 to enhance performance of the memory sub-system 110. Selection of the SBR threshold tunes the error correction capability of the memory sub-system 110. In particular, by carefully adjusting the SBR thresholds, the reliability of data read from the memory device 130 and the memory device 140 is increased, reducing the likelihood of data corruption and improving overall system stability. Additionally, the systematic selection of the SBR thresholds contributes to more efficient data compression. For example, if the SBR thresholds are set to increase the mutual information, MI while considering compression ratios, the amount of data that needs to be transferred and stored can be significantly reduced. This leads to better utilization of bandwidth and storage resources, which is helpful in high-density storage applications. Furthermore, the selection of the SBR thresholds leads to reduced read and write latencies, enhancing the performance of the memory sub-system 110. Overall, the strategic selection of SBR thresholds impacts the efficiency, reliability and performance of the memory sub-system 110.

Figure 3:
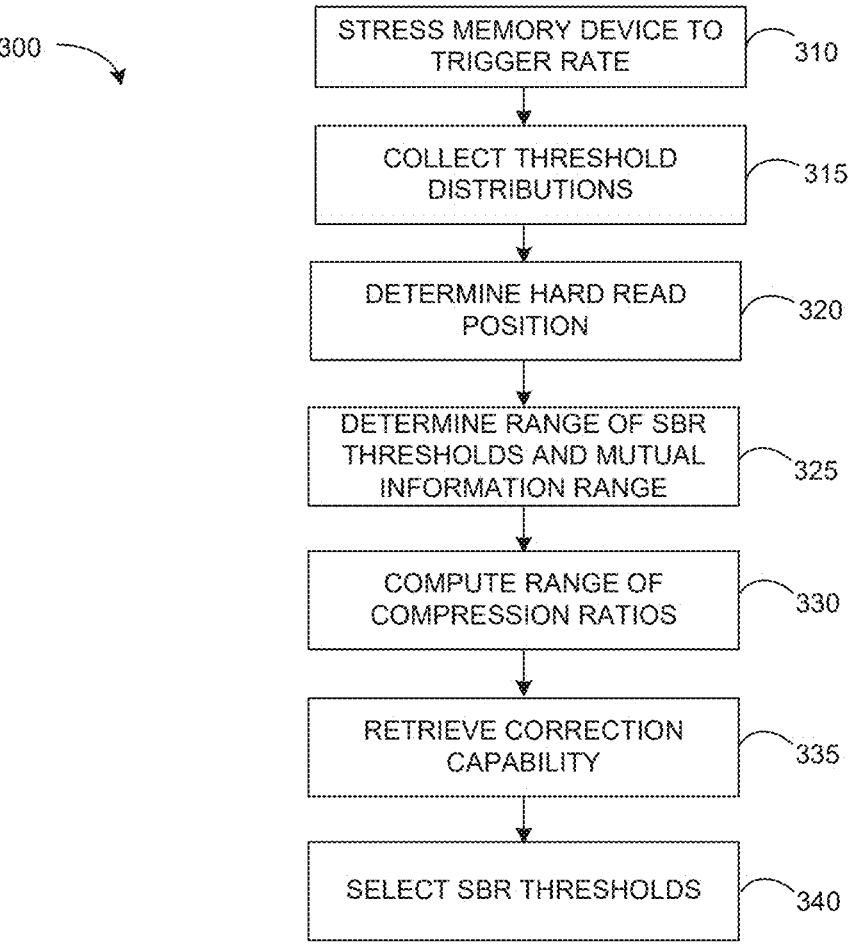
FIG. 3 illustrates a flowchart of an example method for selecting soft bit read thresholds.

FIG. 3 illustrates a flowchart of an example method 300 for selecting SBR thresholds. The method 300 can be implemented, for example, by a controller, such as the memory sub-system controller 115 of the system 100 of FIG. 1A. At block 310 the controller executes a stress test of a memory device (e.g., the memory device 130 or the memory device 140) to a trigger rate. The stress test subjects the memory device to extreme operational conditions to evaluate a durability, reliability and performance of the memory device under high-frequency activities typical in intensive computing environments. This stress test involves configuring the memory to operate at trigger rates exceeding normal operations, using automated software to initiate frequent read, write, and erase commands. Throughout the test, parameters such as error rates, power consumption and thermal conditions are recorded to assess the impact of such high trigger rates. The data collected provides insights into the performance of the memory device, endurance and data integrity.

At block 315, the controller collects threshold voltages, $V_t$ distributions. More particularly, the controller measures and records voltage levels at which memory cells of the memory device change states. During collection, a series of voltage sweeps are applied to the memory cells, and the response of each cell is monitored to determine a precise voltage that causes the memory cell to change state. These voltage thresholds, $V_t$ are then compiled into a distribution graph, which illustrates a range and frequency of threshold voltages across the array of memory cells of the memory device to select a particular $V_t$ for the memory device. At block 320, the controller determines a Hard Read Position, HRP of the memory device by analyzing the $V_t$ distributions to identify a most common or average threshold voltage where the majority of cells switch states. The HRP is selected to minimize the Read Bit Error Rate (RBER) while ensuring reliable differentiation between the stored data states. The HRP serves as the central reference point around which other read operations and error correction strategies are structured enabling efficient and accurate data retrieval from the memory device.

At block 325, the controller determines a range of SBR thresholds employable for the memory device. To determine the range of SBR thresholds for a memory device, the controller executes a sweep of SBR thresholds to identify a set of SBR thresholds, SBR (NEG) and SBR (POS) that provide a maximum mutual information, $MI_{Max}$. This sweep of the SBR thresholds also provides a range of the MI. At block 330, the controller computes a range of theoretical compression ratios, $CR_{TH}$ based on the range of SBR values. Additionally, this range includes a maximum theoretical compression ratio, $CR_{Max}$ that corresponds to a set of SBR thresholds that have a greatest compression ratio.

At block 335, a correction capability range of an LDPC code is retrieved from local memory (e.g., the local memory 119 of FIG. 1A) by the controller. The correction capability range defines a correction capability, CC of the memory device for the range of SBR thresholds.

At block 340, the controller employs the range of mutual information, MI and the range of compression ratios, CR to select SBR thresholds for the memory device from the range of SBR thresholds. In a first example, the controller inputs different values of MI and CR into a cost function (e.g., the first version of the cost function, C1(MI,CR) to identify corresponding SBR thresholds (e.g., a set of values of the SBR thresholds, SBR (NEG) and SBR (POS)) that have the greatest cost as indicated by the cost function. In a second example, the controller inputs different values of MI, CC and CR into a cost function (e.g., the second version of the cost function, C2(MI,CC,CR) to identify SBR thresholds that have the greatest cost, as indicated by the cost function. In a third example, the controller has a predetermined minimum target compression ratio stored in the local memory. In this example, the controller is configured to select the SBR thresholds that provide a maximum correction capability, $CC_{TAR}$ that still delivers the minimum target compression ratio. In a fourth example, the controller has a minimum target correction capability, $CC_{TAR}$ stored in the local memory. In this example, the controller is configured to select the SBR thresholds that provide a maximum compression ratio, CR that still delivers the minimum target compression ratio, $CC_{TAR}$. Accordingly, the selected SBR thresholds, SBR (NEG) and SBR (POS) are employable for soft reads (1H2S) or (1H1S) of the memory device.

Figure 4:
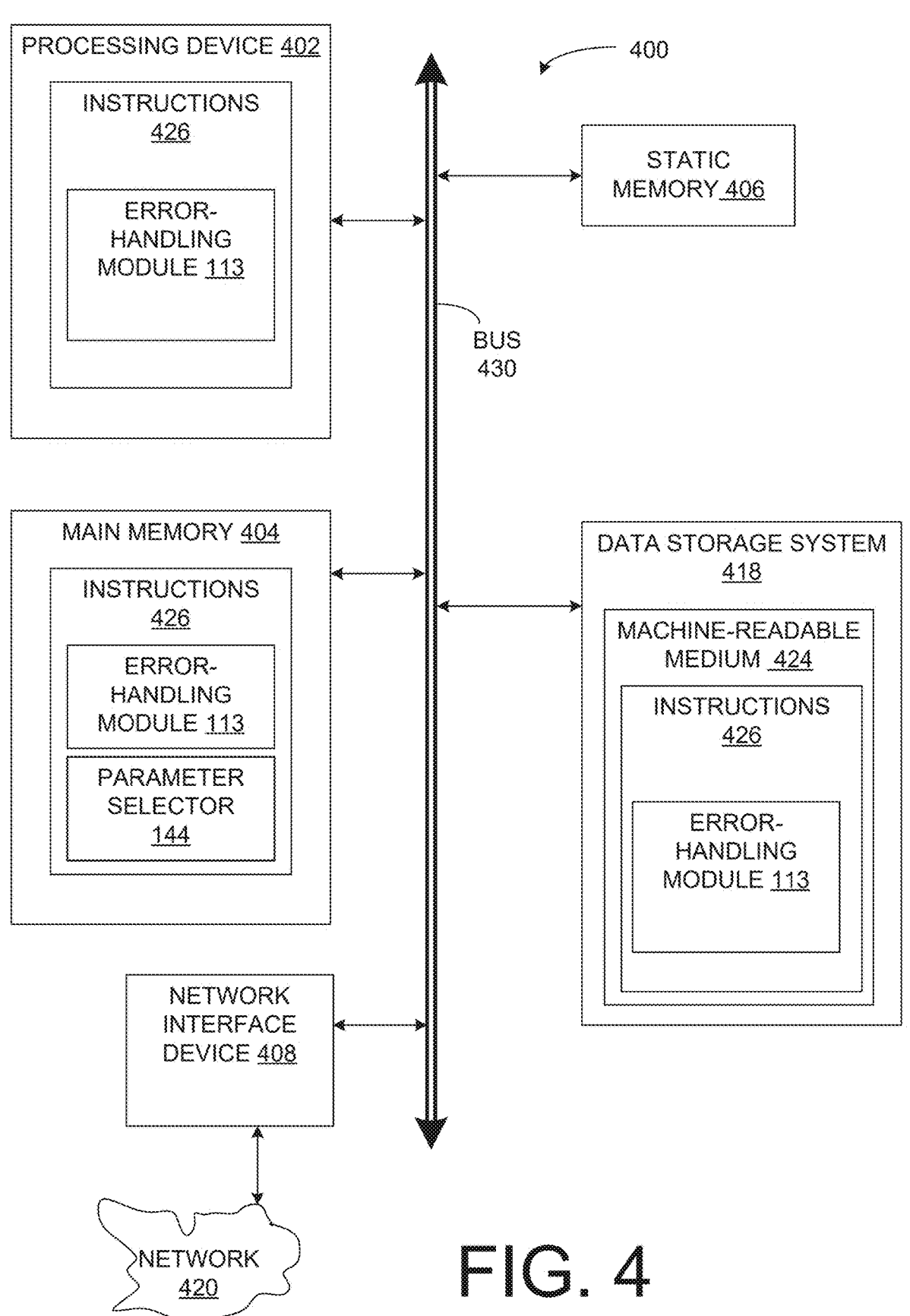
FIG. 4 illustrates an example of a computer system (a machine) in which examples of the present description may operate.

FIG. 4 illustrates an example machine of a computer system 400 (a machine) within which a set of instructions, for causing the machine to perform any one or more of the methodologies discussed herein, can be executed. In some examples, the computer system 400 corresponds to a host system (e.g., the host system 120 of FIG. 1A) that includes, is coupled to, or utilizes a memory sub-system (e.g., the memory sub-system 110 of FIG. 1A) or is used to perform the operations of a controller (e.g., to execute an operating system to perform operations corresponding to parameters selector 144 and the error-handling module 113 of FIG. 1A). In other examples, the machine is connected (e.g., networked) to other machines in a LAN, an intranet, an extranet and/or the Internet. In various examples, the machine operates in the capacity of a server or a client machine in client-server network environment, as a peer machine in a peer-to-peer (or distributed) network environment or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge or any machine capable of executing a set of instructions (sequential or otherwise) that specify actions to be taken by that machine. In other examples, the machine may be a computer within an automotive, a data center, a smart factory or other industrial application. Further, while a single machine is illustrated, the term "machine" shall also be taken to include any collection of machines that individually or jointly execute a set (or multiple sets) of instructions to perform the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM) or other non-transitory computer-readable media) and a data storage system 418, which communicate with each other via a bus 430.

The processing device 402 represents one or more general-purpose processing devices such as a microprocessor, a central processing unit, etc. More particularly, the processing device 402 can be a complex instruction set computing (CISC) microprocessor, reduced instruction set computing (RISC) microprocessor, very long instruction word (VLIW) microprocessor or a processor implementing other instruction sets or processors implementing a combination of instruction sets. In some examples, the processing device 402 is implemented with a special-purpose processing devices such as an application specific integrated circuit (ASIC), a field programmable gate array (FPGA), a digital signal processor (DSP), network processor, etc. The processing device 402 is configured to execute instructions 426 for performing the operations discussed herein. In some examples, the computer system 400 includes a network interface device 408 to communicate over the network 420.

The data storage system 418 includes a machine-readable storage medium 424 (also known as a computer-readable medium) that store sets of instructions 426 or software for executing the methodologies and/or functions described herein. The machine-readable storage medium 424 is a non-transitory medium. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418 and/or main memory 404 can correspond to the memory sub-system 110 of FIG. 1A. Accordingly, the machine-readable storage medium 424, the data storage system 418 and/or the main memory 404 are examples of non-transitory computer-readable media.

In some examples, the instructions 426 include instructions to implement functionality corresponding to the error-handling module 113 and the parameters selector 144 of FIG. 1A. While the machine-readable storage medium 424 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared and otherwise manipulated. It has proven convenient at times, principally for reasons of common usage, to refer to these signals as bits, values, elements, symbols, characters, terms, numbers, etc.

It is noted, however, that all of these and similar terms are to be associated with the appropriate physical quantities and are merely convenient labels applied to these quantities. This description can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

This description also relates to an apparatus for performing the operations herein. This apparatus can be specially constructed for the intended purposes or this apparatus can include a general purpose computer selectively activated or reconfigured by a computer program stored in the computer. Such a computer program can be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards or any type of media suitable for storing electronic instructions, each coupled to a computer system bus.

The algorithms and displays presented herein are not inherently related to any particular computer or other apparatus. Various general purpose systems can be used with programs in accordance with the descriptions herein, or it can prove convenient to construct a more specialized apparatus to perform the method. In addition, the present disclosure is not described with reference to any particular programming language. It will be appreciated that a variety of programming languages can be used to implement the teachings of the disclosure as described herein.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means "based at least in part on". Additionally, where the disclosure or claims recite "a," "an," "a first" or "another" element, or the equivalent thereof, it should be interpreted to include one or more than one such element, neither requiring nor excluding two or more such elements.

What is claimed is:

1. A method for selecting Soft Bit Read (SBR) thresholds in a memory device, comprising:

setting, by a controller of a memory sub-system, a range of SBR thresholds around a Hard Read Position (HRP) for the memory device by determining a lower SBR threshold positioned below the HRP by a negative voltage offset and a higher SBR threshold positioned above the HRP by a positive voltage offset at predefined voltage intervals for four reliability regions in threshold voltage distributions of memory cells;

calculating, by the controller, mutual information for each set of SBR thresholds within the range of SBR thresholds by computing probabilities that bits are found in the four reliability regions using entropy calculations, wherein the mutual information quantifies how accurately data read from the memory device represents original data written to the memory device;

calculating, by the controller, a theoretical compression ratio for each set of SBR thresholds in the range of SBR thresholds by determining probabilities of weak bits and strong bits based on the four reliability regions and computing entropy of a strong-weak vector to determine compressibility of soft information transferred through an interface;

selecting, by the controller, SBR thresholds from the range of SBR thresholds that provide a balance of the mutual information and the theoretical compression ratio by applying a cost function that weighs the mutual information and theoretical compression ratio to evaluate threshold combinations within the range and select thresholds based on the evaluation; and employing the selected SBR thresholds for soft read operations of the memory device.

2. The method of claim 1, further comprising:

collecting, by the controller, threshold voltage distributions of memory cells within the memory device; and determining, by the controller, the HRP for the memory device based on the collected threshold voltage distributions.

3. The method of claim 1, wherein the selecting further comprises:

selecting one of the corresponding SBR thresholds from the range of SBR thresholds with a greatest cost as indicated by the cost function.

4. The method of claim 3, wherein weights of the cost function are adjusted dynamically based on performance data from the memory device.

5. The method of claim 3, wherein applying the cost function further comprises inputting values of a correction capability of data stored in the memory device for the corresponding SBR thresholds into the cost function.

6. The method of claim 1, wherein selection of the SBR thresholds is further based on operational specifications of a system incorporating the memory device.

7. The method of claim 1, wherein the selected SBR thresholds are employed in soft read operations of the memory device to balance error correction capabilities with data transfer efficiency.

8. The method of claim 1, wherein the memory device is a Not-AND (NAND) flash memory device.

9. A system for selecting Soft Bit Read (SBR) thresholds in a memory device, comprising:

a memory device; and a processing device coupled to the memory device, the processing device to perform operations comprising:

setting, by a controller of a memory sub-system, a range of SBR thresholds around a Hard Read Position (HRP) for the memory device by determining a lower SBR threshold positioned below the HRP by a negative voltage offset and a higher SBR threshold positioned above the HRP by a positive voltage offset at predefined voltage intervals for four reliability regions in threshold voltage distributions of memory cells;

calculating, by the controller, mutual information for each set of SBR thresholds within the range of SBR thresholds by computing probabilities that bits are found in the four reliability regions using entropy calculations, wherein the mutual information quantifies how accurately data read from the memory device represents original data written to the memory device;

calculating, by the controller, a theoretical compression ratio for each set of SBR thresholds in the range of SBR thresholds by determining probabilities of weak bits and strong bits based on the four reliability regions and computing entropy of a strong-weak vector to determine compressibility of soft information transferred through an interface;

selecting, by the controller, SBR thresholds from the range of SBR thresholds that provide a balance of the mutual information and the theoretical compression ratio by applying a cost function that weighs the mutual information and theoretical compression ratio to evaluate threshold combinations within the range and select thresholds based on the evaluation; and employing the selected SBR thresholds for soft read operations of the memory device.

10. The system of claim 9, wherein the operations further comprise:

collecting threshold voltage distributions of memory cells within the memory device; and determining the HRP for the memory device based on the collected threshold voltage distributions.

11. The system of claim 9, wherein the selecting further comprises:

selecting one of the corresponding SBR thresholds from the range of SBR thresholds with a greatest cost as indicated by the cost function.

12. The system of claim 9, wherein the selecting of the SBR thresholds is further based on operational specifications of a system incorporating the memory device.

13. A non-transitory computer-readable storage medium comprising instructions that, when executed by a processing device, cause the processing device to perform operations comprising:

setting, by a controller of a memory sub-system, a range of SBR thresholds around a Hard Read Position (HRP) for a memory device by determining a lower SBR threshold positioned below the HRP by a negative voltage offset and a higher SBR threshold positioned above the HRP by a positive voltage offset at predefined voltage intervals for four reliability regions in threshold voltage distributions of memory cells;

calculating, by the controller, mutual information for each set of SBR thresholds within the range of SBR thresholds by computing probabilities that bits are found in the four reliability regions using entropy calculations, wherein the mutual information quantifies how accurately data read from the memory device represents original data written to the memory device;

calculating, by the controller, a theoretical compression ratio for each set of SBR thresholds in the range of SBR thresholds by determining probabilities of weak bits and strong bits based on the four reliability regions and computing entropy of a strong-weak vector to determine compressibility of soft information transferred through an interface;

selecting, by the controller, SBR thresholds from the range of SBR thresholds that provide a balance of the mutual information and the theoretical compression ratio by applying a cost function that weighs the mutual information and theoretical compression ratio to evaluate threshold combinations within the range and select thresholds based on the evaluation; and employing the selected SBR thresholds for soft read operations of the memory device.

14. The non-transitory computer-readable storage medium of claim 13, wherein the memory device is a Not-AND (NAND) flash memory device, and the selected SBR thresholds are employed in soft read operations of the memory device to balance error correction capabilities with data transfer efficiency.

* * * * *